United States Patent [19]
Simpson

[11] Patent Number: 6,060,702
[45] Date of Patent: May 9, 2000

[54] LOW-COST LIGHT-WEIGHT STAR TRACKING TELESCOPE

[75] Inventor: A. Phillip Simpson, Rancho Palos Verdes, Calif.

[73] Assignee: Microcosm, Inc., Torrance, Calif.

[21] Appl. No.: 08/934,859

[22] Filed: Sep. 22, 1997

[51] Int. Cl.[7] ............................. G01C 21/02; G02B 23/00
[52] U.S. Cl. ........................................ 250/203.6; 359/399
[58] Field of Search ............................. 250/203.1, 203.3, 250/203.6, 216; 359/399, 727, 730

[56] References Cited

U.S. PATENT DOCUMENTS 5,206,499  4/1993  Mantravadi et al. ................ 250/203.6

*Primary Examiner*—Edward P. Westin
*Assistant Examiner*—Kevin Pyo
*Attorney, Agent, or Firm*—Noel F. Heal

[57] ABSTRACT

Three folded Maksutov/Bouwers telescopes formed in a single housing to provide focused images from three angularly spaced fields of view. The fields of view are positioned 30° from a central axis and are spaced 120° apart in azimuth. Light enters the telescopes through a common upper aperture, in which a concentric corrector is installed, is reflected from a common lower plane mirror and from one of three inclined mirrors into one of three spherical primary mirrors. The spherical mirrors focus the respective beams onto three focal planes located outside the housing, through openings in the respective inclined mirrors. The concentric corrector compensates for spherical aberration in the spherical primary mirrors, without the need for holographic optical elements, resulting in a simple, compact, lightweight and low-cost device.

2 Claims, 3 Drawing Sheets

LOW-COST LIGHT-WEIGHT STAR TRACKING TELESCOPE

BACKGROUND OF THE INVENTION

This invention relates generally to stellar object sensors and, more particularly, to telescopes for use in stellar object sensors. Attitude determination and navigation in space typically rely on measurement of the angular positions of stars or solar system objects. A stellar sensor or tracker includes some form of optical telescope to focus light from a stellar object, or distant planet which presents a stellar-like appearance, onto a sensor. Preferably, a star tracker should be able to receive light from multiple fields of view simultaneously, and focus images from these fields of view onto multiple sensors located at different focal planes of the telescope. Although the primary use for devices of this type is to sense or track the positions of stellar objects, star trackers can also be used for feature recognition or scientific observation of a planetary surface, or to perform an attitude sensing function in conjunction with tracking lights on a spacecraft (a function referred to as attitude transfer), or for detecting other spacecraft in a station-keeping function in a constellation of spacecraft.

Various embodiments of a stellar sensor of the prior art are disclosed in U.S. Pat. No. 5,012,081 issued to Jungwirth et al. and U.S. Pat. No. 5,206,499 issued to Mantravadi et al. The latter patent discloses a star sensor telescope for focusing radiation from three angularly spaced fields of view onto separate sensors, using three folded Schmidt telescopes in a single enclosure. The disclosed star sensor telescope necessarily includes a holographic optical element (HOE) for spherical aberration correction, which limits the bandwidth of detectable electromagnetic radiation. There is still a need for a star sensor that is lighter in weight, smaller in size, and is of relatively low cost. The present invention fulfills this need, as will become apparent from the following summary and more detailed description.

SUMMARY OF THE INVENTION

The present invention resides in a versatile, wide bandwidth, multiple field-of-view telescope of the Maksutov/Bouwers type, suitable for use as a star tracker or imager. The telescope of the invention comprises an aperture for receiving light rays from a plurality of angularly spaced fields of view; a first plane mirror for reflecting the received light rays; a plurality of inclined plane mirrors, one for each of the fields of view, for receiving light rays reflected from the first plane mirror; and a plurality of spherical primary mirrors, one for each of the fields of view, for receiving light rays from the respective inclined plane mirrors and focusing the light rays at a plurality of respective focal planes. Light reflected from each spherical primary mirror passes through an opening in a corresponding inclined plane mirror to reach its focal plane. The telescope of the invention also includes a hemispherical concentric corrector having spherical faces that are optically concentric with the spherical primary mirrors. The common center of curvature is located in the aperture, and the single corrector plate serves to simultaneously correct spherical aberration in all the primary mirrors.

Use of the Maksutov/Bouwers folded telescope configuration results in a simple and compact design with no holographic optical elements required, providing for accurate imaging of a plurality of widely spaced objects. Other aspects and advantages of the invention will become apparent from the following more detailed description, taken in conjunction with the accompanying drawings.

DESCRIPTION OF THE PREFERRED EMBODIMENT

Figure 1:
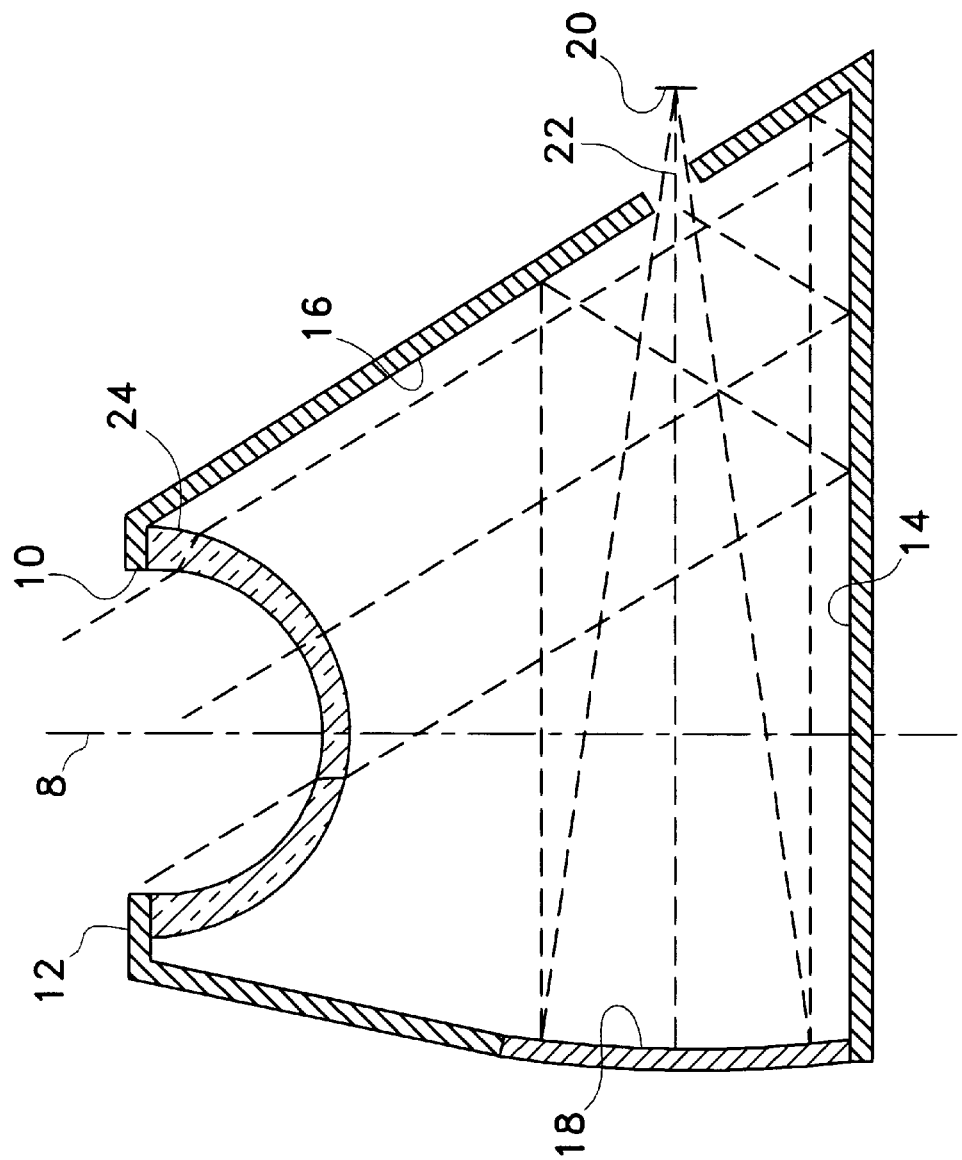
FIG. 1 is a diagrammatic side view of a star sensor telescope in accordance with the present invention, showing the folded optical path from a single field of view to a focal plane detector.
Figure 2:
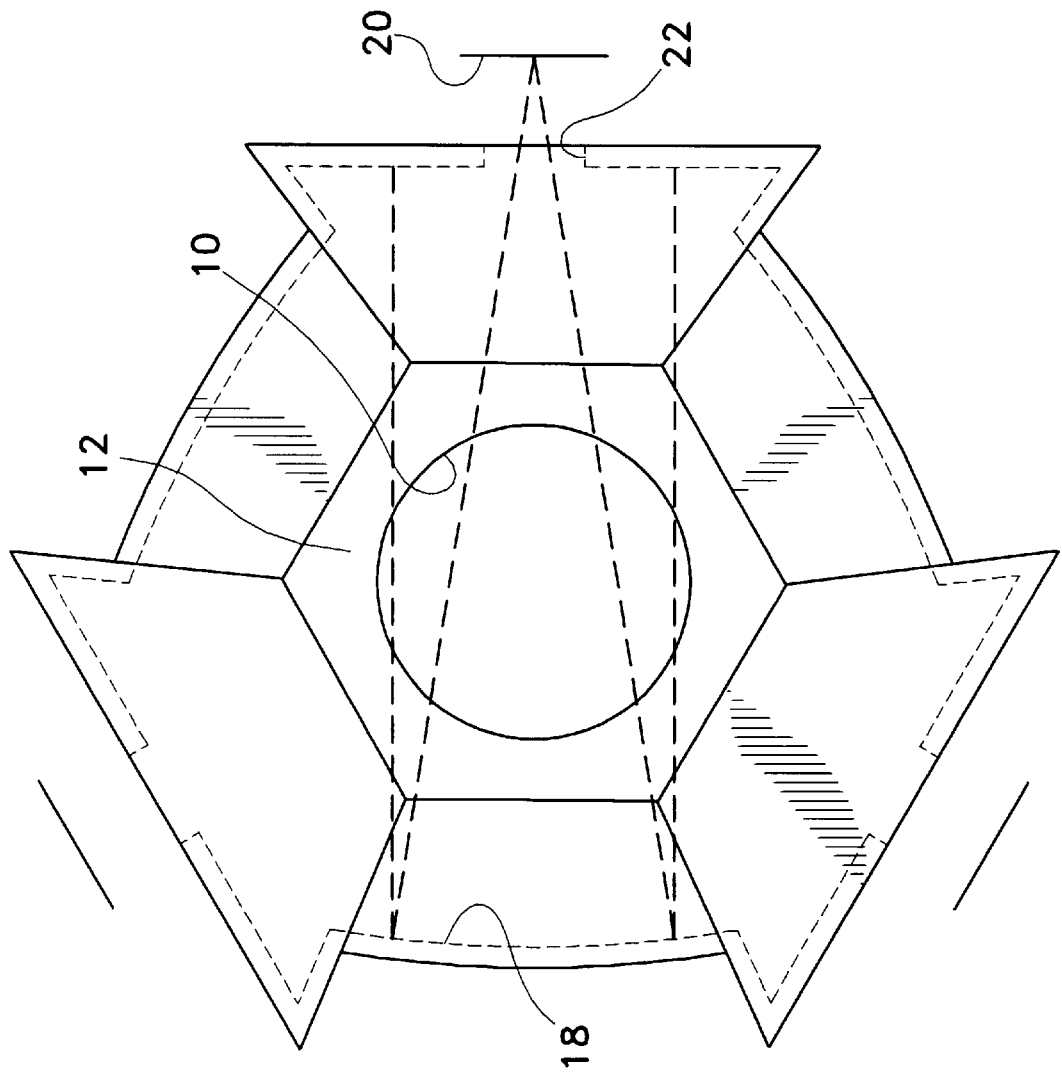
FIG. 2 is a top view of the star sensor telescope of FIG. 1, again showing only one of three optical paths.

As shown in the drawings for purposes of illustration, the present invention pertains to optical star sensors. Ideally, sensors or this type should be able to receive light from multiple, angularly-spaced fields of view, to provide images of multiple stellar objects simultaneously. In the stellar sensor shown in U.S. Pat. No. 5,206,499 to Mantravadi et al., a disclosed star sensor uses a Schmidt telescope, which has a spherical mirror and an aperture stop at the center of curvature of the mirror. The Schmidt telescope (or camera) is described in many standard texts on optics, for example Harrie Rutten & Martin van Venrooij, *Telescope Optics, Evaluation and Design,* Willmann-Bell, Inc. (1988), Chapter 8, *The Schmidt Camera* (pp. 71–78). Because it has no preferred optical axis, a spherical mirror has no off-axis aberrations, such as coma and astigmatism. Because of its spherical symmetry, however, the Schmidt solution suffers from spherical aberration, which causes rays reflected from the outer edge of the mirror to focus closer to the mirror than those reflected from the center, thus blurring the resulting image. Schmidt's solution to this problem requires the addition of a thin, nearly flat plate with complex curvature on one or both faces. The refraction resulting from this curvature bends the light rays so that they strike the spherical mirror at a different angle and position, with the angle deviation being most important. Variations of the curvature of the Schmidt corrector can result in moving the focus of the rays from the outer portion of the mirror farther out to coincide with the central focus, or moving the central focus in to coincide with the peripheral focus, or moving both focus points to some intermediate point. In the latter case, the corrector plate has a central "hill" and "trough" at some distance from the center, usually about 75–87% of the corrector radius. This solution works very well for a field-of-view up to a few degrees (usually 4–6°). A practical star sensing telescope cannot use a single corrector plate of this type because of the desirability of receiving light from at least three fields of view, which are angularly separated by about 57° in the presently preferred embodiment of the invention. The most desirable separation angle would be 90°, but any angle greater than 20° to 30° could be used.

The Mantravadi et al. patent mentioned above discloses a modification of the Schmidt corrector, wherein a conventional glass corrector lens is replaced by a holographic optical element (HOE), consisting of a thin layer of dichromated gelatin (DCG) between two flat glass plates. The DCG is exposed to light forming the proper diffraction pattern and developed in a manner analogous to developing photographic film. The DCG then reproduces the diffraction pattern and diffracts incident light in directions that correspond to the directions of refraction through a conventional Schmidt corrector plate. Like photographic film, the DCG can record multiple exposures in the same medium. Therefore, Mantravadi et al. were able to superimpose three separate corrector plates in the DCG, one for each telescope field of view. Moreover, because the angles between the three incident light beams are relatively large, the diffraction pattern designed for one has little effect on the others. Only light beams that are close to the design angle of the HOE are significantly affected by its diffraction pattern. Thus the Mantravadi et al. design has the ability to receive light from multiple, angularly spaced fields of view, but with the additional cost and complexity of a holographic optical element. Another disadvantage of holographic optical elements is that they cause chromatic aberration proportional to the induced deviation angle of the element. The chromatic aberration limits the usable bandwidth to about 200 nm. Another shortcoming of holographic optical elements is that they suffer material degradation in space, because the gelatin material used degrades in the vacuum and radiation environment.

In accordance with the present invention, light beams from multiple fields of view are separately focused by multiple folded telescopes of the Maksutov/Bouwers type, onto three separate focal plane detectors, without the need for a holographic optical element for correction of spherical aberration. The principles of the Maksutov telescope are also set forth in the text Harrie Rutten & Martin van Venrooij, *Telescope Optics, Evaluation and Design,* Willmann-Bell, Inc. (1988), Chapter 10, *The Maksutov Camera,* (pp. 93–98). The principle of the Bouwers concentric meniscus corrector is explained in another text, Daniel J. Schroeder, *Astronomical Optics,* Academic Press, (1987) New York, Chapter 8, *Catadioptric Telescopes and Cameras,* Section II, *Cameras with Meniscus Correctors,* pp. 152–158.

As shown in FIG. 1, light from a field of view located at 30° from a central axis 8 of the telescope (which is shown as a vertical line in the drawing) enters a central aperture 10 in a top wall 12 of the telescope housing and impinges on a plane mirror 14 forming the bottom wall of the device. The light is reflected from the mirror 14 onto a second plane mirror 16 inclined at an angle of 60° to the bottom mirror 14. Thus the light reflected from the inclined mirror 16 is generally parallel with the bottom mirror 14 and perpendicular to the central axis 8. The twice-reflected light next impinges on a primary concave spherical mirror 18, from which it is reflected and focused onto a focal plane 20 outside the inclined mirror 16, through an opening 22 in this mirror. For high precision applications, a concentric corrector 24 is installed in the central aperture 10, to compensate for spherical aberration of the primary mirror 18. For less demanding applications, such as attitude determination, correction for spherical aberration can be eliminated for further reduction in weight and cost.

Figure 3:
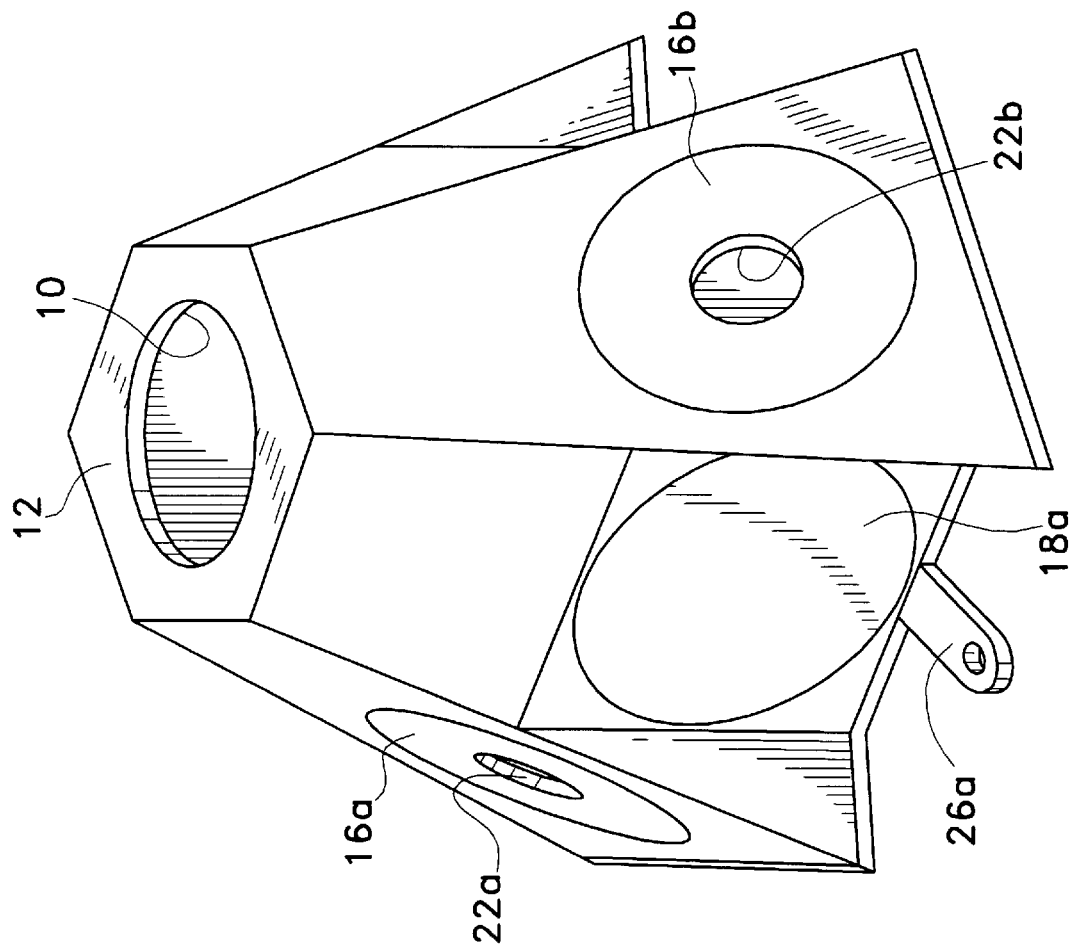
FIG. 3 is a perspective view of the star sensor telescope of the invention.

FIG. 3 shows the telescope of the invention in a perspective view. The drawing shows two of three inclined plane mirrors 16*a* and 16*b*, two of three associated apertures 22*a* and 22*b*, one of three spherical primary mirrors 18*a*, and one of three mounting lugs 26*a*. It will be understood that, although the drawing shows three folded telescopes in a single device, appropriate modifications could be made to accommodate five or even seven telescopes. However, the presently preferred embodiment is the one depicted.

The concentric corrector 24 uses the correction principles first proposed by Bouwers, who at the time was unaware of another corrector plate used by Dimitri Maksutov, in the Maksutov telescope or camera. Maksutov's solution to the spherical aberration problem was to introduce a deeply curved meniscus lens, i.e. one with both surfaces curved in the same direction. Refraction at the first surface bends light rays outward, and refraction at the second surface bends them back inward to nearly their original angle. Thus the main effect of the Maksutov corrector is to displace the rays in position rather than in angle. The corrector could be designed in two ways: either with the surfaces concentric with the primary mirror, or with the corrector located closer to the primary mirror and the centers of curvature changed to give better overall correction and a smaller overall optical size. Maksutov preferred the latter solution. Bouwers, another designer who independently discovered the same solution, preferred the former solution, i.e., the concentric version. Like the Schmidt design, the standard Maksutov design could not provide correction for multiple fields of view. However, the Bouwers concentric version works over a very large range of received light angles. In the Maksutov-Bouwers version used in the present invention, all of the curved optical surfaces are spherical and optically concentric. This is not readily apparent from the drawings because of the folded optical path. If the optical path were to be "unfolded," one could see more clearly that the center of curvature of the concentric corrector 24 is the same as the center of curvature of the primary mirror 18. This characteristic results in a system that has no unique optical axis, since all incoming rays are equivalent, and theoretically could give a field of view limited only by physical interference of the optical elements with light rays entering at extreme angles. To accommodate the large angle between the optical axes without cutting off some of the peripheral rays, the concentric corrector 24 must be so large that it is almost a complete hemisphere.

The focal length of the primary mirrors 18 in the preferred embodiment is 1.77 inches (approximately 45 mm), and the overall width of the telescope is slightly less than this dimension. The overall height is 0.886 inch (approximately 22 mm). The weight of the telescope, including the optical elements and housing, is only approximately 50 gm. The entire sensor, including optical head, focal plane sensor arrays, processing electronics and associated housing, should not exceed 500 gm in weight.

The entire unit, except the concentric corrector, is a single electroformed nickel housing with seven internal mirrors coated with a very thin layer of gold. This single-electroformed-structure approach offers increased mirror alignment stability and ease of calibration, and provides uniform thermal properties for the nickel housing and the embedded mirrors. All optical elements, except the corrector, are reflective and the single corrector is used to correct spherical aberration for all of the telescopes simultaneously.

It will be appreciated from the foregoing that the present invention represents a significant advance in the field of star sensors/trackers. In particular, the invention provides a compact, structurally rigid, light-weight sensor of relatively low cost. These advantages are due principally to the use of common optics and a common housing for multiple telescopes, to the use of reflective optical elements, except for a thin corrector element, and to the relatively wide bandwidth that the telescope provides. Although a specific embodiment of the invention has been illustrated, it will be understood that modifications of the illustrated embodiment will also fall within the scope of the invention. Accordingly, the invention should not be limited except as by the appended claims.

What is claimed is:

1. A multiple field of view telescope suitable for use as a star tracker or imager, comprising:

an aperture for receiving light rays from a plurality of angularly spaced fields of view;

a first plane mirror for reflecting the received light rays;

a plurality of inclined plane mirrors, one for each of the fields of view, for receiving light rays reflected from the first plane mirror;

a plurality of spherical primary mirrors, one for each of the fields of view, for receiving light rays from the respective inclined plane mirrors and focusing the light rays at three respective focal planes, wherein light reflected from each concave primary mirror passes through an opening in a corresponding inclined plane mirror to reach its focal plane; and a corrector plate having spherical faces that are optically concentric with the spherical primary mirrors, wherein a common center of curvature is located in the aperture, and wherein the corrector plate serves to correct spherical aberration in the primary mirrors.

2. A multiple field of view telescope as defined in claim 1, wherein:

the number of primary mirrors is three, for viewing three angularly separated fields of view.

* * * * *